United States Patent Office 3,417,119
Patented Dec. 17, 1968

3,417,119
PREPARATION OF QUATERNARY AMMONIUM ALUMINUM HYDRIDES
Robert Ehrlich, Morristown, N.J., assignor to Thiokol Chemical Corporation, Bristol, Pa., a corporation of Delaware
No Drawing. Filed May 9, 1963, Ser. No. 280,495
13 Claims. (Cl. 260—448)

This invention relates generally to novel quaternary ammonium metallic hydrides and to a process for preparing them.

More particularly this invention concerns the preparation of quaternary ammonium aluminum hydrides useful in synthetic organic chemistry as reducing agents and organic intermediates. These novel compounds are particularly valuable for the above uses because of their solubility in a variety of organic solvents. The novel compounds of this invention are included within the scope of the formula:

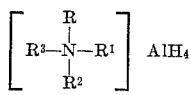

wherein R, R$^1$, R and R$^3$ which can be the same or different are alkyl radicals straight chains or branched chains joined or conjoined.

Illustrative of the many quaternary ammonium aluminum hydrides intended to be included within the scope of this invention are those compounds where all four alkyl substituents are the same such as: tetramethylammonium aluminohydride, tetraethylammonium aluminohydride, tetraisopropylammonium aluminohydride, tetra-n-propylammonium aluminohydride, tetra-n-butylammonium aluminohydride, tetraisobutylammonium aluminohydride, tetra-n-amylammonium aluminohydride, tetra-n-hexylammonium aluminohydride, tetra-n-heptylammonium aluminohydride, tetra-n-octylammonium aluminohydride, tetra-n-nonylammonium aluminohydride, tetra-n-decylammonium aluminohydride, tetralaurylammonium aluminohydride, and tetrastearylammonium aluminohydride as well as those compounds where the one or more of the alkyl substituents differ such as: trimethylethylammonium aluminohydride, trimethyl-n-propylammonium aluminohydride, trimethyl-n-octylammonium aluminohydride, trimethyl-n-stearylammonium aluminohydride triethyl - n-propylammonium aluminohydride, triethyl-n-octylammonium aluminohydride, tripropyl-n-octylammonium aluminohydride, dimethyl-n-octyl-n-laurylammonium aluminohydride, dimethyl-n-stearyl-n-octylammonium aluminohydride and the like.

Lithium aluminum hydride and aluminum hydride are well known and powerful reagents for reducing unsaturated organic compounds as well as reducible groups such as carbonyl groups, hydroxyl groups and the like. Unfortunately both these reagents have several disadvantageous properties which limit their widespread use as reducing agents and make their storage and handling hazardous. For example, both reagents react explosively with water, are pyrophoric in an oxygen atmosphere and are inactivated by contact with even the relatively small amount of oxygen in the air. Two more serious shortcomings of both reagents are their poor solubility in nonether solvents and their lack of stereospecificity in reductions. For instance, both reagents are poorly soluble in the paraffinic and aromatic solvents such as hexane, cyclohexane, benzene, toluene and the like. These solvents are desirble to use as reducing media because of their relative inertness, non-explosiveness, low cost and availability. Furthermore, the ethers used with the prior art reducing agents, form explosive peroxides upon prolonged storage which must be removed to minimize explosion hazards. In contrast the common paraffinic and aromatic solvents are stable during storage and require no special precautions for safe use. Since most reductions in organic synthesis must be conducted in the presence of inert solvents, the development of reducing agents that are sufficiently soluble to use in the common reaction solvents represents a valuable advance in the art. A second disadvantage of lithium aluminum hydride and aluminum hydride is their lack of stereospecificity when used as reducing agents. Stereospecificity in reducing agents permits the reduction of certain reducible groups in the molecule to the exclusion of others. Frequently in synthetic organic chemistry particularly in steroid chemistry it is desirable to reduce certain reducible groups while leaving others untouched. While lithium hydride and lithium aluminum hydride are both powerful reducing agents they will reduce all the reducible groups in a molecule regardless of steric hindrance. The sole limiting factor is the supply of reducing agent. For this reason neither lithium aluminum hydride nor aluminum hydride can be used for selective reductions. It is desirable therefore to prepare reducing agents that are stable, soluble in the common reaction solvents and are stereospecific as reducing agents. Since two of the most commonly used reducing agents (lithium aluminum hydride and aluminum hydride) do not possess any of these characteristics, the development of a novel group of reducing agents which possesses all of these attributes is both novel and unexpected.

Thus it is an object of this invention to prepare stable and easily handled reducing agents.

It is a further object of this invention to prepare a novel series of reducing agents which are stereospecific in their reductive propensities.

It is a further object of this invention to prepare reducing agents which are soluble in the common reaction solvents in addition to the ethers.

It is yet a further object of this invention to prepare reducing agents which possess all of the above objects in one class of compounds.

Yet another object of this invention is the preparation of a novel series of organic compounds useful as organic intermediates.

The above objects of this invention among others are achieved by the preparation of the novel quaternary ammonium aluminum hydrides of this invention.

These compositions can be prepared by novel processes heretofore unreported in the technical literature.

In one process embodiment of this invention, an alkali metal aluminum hydride in the presence of an inert solvent such as the aromatics or substituted aromatics is contacted with a quaternary ammonium salt until substantial conversion of the reactants to the quaternary ammonium aluminohydride takes place. The main reaction can be represented as follows:

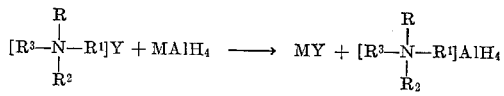

wherein R, R$^1$, R$^2$, and R$^3$ are alkyl radicals which can be the same or different, straight chain or branched chain, joined or conjoined, Y is an anion such as the halides, nitrate, hydroxide, perchlorate, acetate, nitrate, formate, nitrite or the like, as well as any other stable, solution, suitable salt, and M is an alkali metal, such as sodium, potassium and lithium.

While the above process embodiment is excellent for the preparation of the higher alkylated products, yields are only fair, where the total carbons in the alkyl substituents number less than 24. The reason for this is believed to be that the lower alkyl substituents being more ionic are poorly soluble in the inert organic solvent and the reaction interchange does not completely take place. Thus, particularly for the preparation of quaternary ammonium aluminohydrides whose alkyl substituents contain less than a total of 16 carbon atoms, an alternative process gives superior yields. In the alternative process embodiment, a quaternary ammonium thioaryloxide is contacted with an alkali metal aluminum hydride preferably in the presence of an ether-type solvent until the desired quaternary ammonium aluminohydride product is formed and precipitates out. The quaternary ammonium thioaryloxide intermediate in turn is prepared from the reaction of the appropriate quaternary ammonium hydroxide with an aryl thiophenol or substituted aryl thiophenol. The latter preparation is preferably conducted in an aqueous medium, an alcoholic medium or an aqueous-alcoholic medium. The novel quaternary thioaryloxides intermediates are prepared by contacting a tetraalkylammonium hydroxide with the desired thiophenol or substituted thiophenol in an inert solvent or solvent mixture until a substantial quantity of intermediate is formed and isolating the intermediate contained therein. The main reaction course of the alternative (Thiophenoxide) process is believed to be as follows:

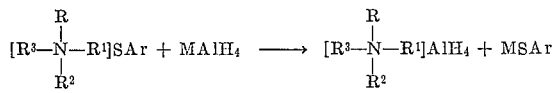

wherein Ar is aryl or substituted aryl and R, $R^1$, $R^2$, and $R^3$ and M have the same meaning previously attributed to them.

The term inert solvent as used throughout this application refers to alkanes such as pentane, hexane and heptane, cycloalkanes such as cyclohexane and aromatics and substituted aromatics as benzene, toluene, xylene, the chlorinated benzenes and toluenes.

The term ether type solvents refers to solvents, aromatic, aliphatic, or cycloaliphatic having one or more ether linkages such as dioxane, tetrahydrofuran and the alkyl and aromatic ethers.

This invention is advantageous in both its process and composition aspects. In its process aspect the invention is advantageous in several respects. One advantage of the process is that the reactants such as the quaternary ammonium salts or quaternary ammonium bases are commerically available compounds or can be synthesized by well known procedures described in the chemical literature including Chemical Abstracts. For example, the tetraalkylammonium halide salt reactants can be prepared by the addition of an alkyl halide to a trialkylamine. The quaternary ammonium thioaryloxides such as the thiophenoxides are prepared by reacting thiophenol with the commercially available or easily synthesized quaternary ammonum hydroxides. The alkali metal aluminum hydrides are commercially available compounds.

An additional advantage of both processes is that they are operable under a wide range of reaction conditions such as temperature and pressure. Both processes give excellent yields at atmospheric pressures and ambient temperatures, but where desired sub- or superatmospheric pressures or lower and high temperatures can be utilized. The order of adding the reactants is not important and the ratio of the reactants to each other is not critical to operability. However to obtain the highest yields it is desirable to use an excess of the alkali metal aluminum hydride reactant over the amount required by stoichiometry. The time required for the formation of a substantial quantity of quaternary ammonium aluminohydride product is a variable dependent upon the reactants used, the reaction temperature and pressure hence it cannot be stated with precision. However, at ambient temperatures and atomspheric pressure the reaction time ordinarily runs between 12–60 hours, with 24–36 hours being a more average time. Increasing the temperature lowers the time considerably.

Additional advantages of the processes are the low cost of the reactants, high yields, freedom from competing reactions and products substantially free from contaminants.

In its composition aspects the novel compositions of this invention are particularly advantageous. For example the composition of this invention particularly the higher alkyl substituted compounds are unique as reducing agents in combining stability, stereospecificity and good general solubility in one composition. The prior art reducing agents as typified by lithiumaluminum hydride and aluminum hydride are much more violently reactive with water and oxygen and as such are less stable. In addition the two prior art reducing agents are poorly soluble in non-ether solvents and being unselective in their reductions cannot be used in reductions where it is desirable to reduce only certain reducible groups of the molecule.

The greater stability of the compositions of this invention makes their storage and use less hazardous than is the case with the prior art reducing agents.

To indicate the preparation, use and advantages of the compositions of this invention the following illustrative examples are submitted.

Example 1.—Preparation of tri-n-octyl-n-propyl-ammonium aluminohydride

To a stirred suspension of 5 parts by weight of lithium aluminum hydride in 80 parts by weight of anhydrous benzene, is added a solution of 47.7 parts by weight of tri-n-octyl-n-propylammonium bromide in 340 parts by weight of anhydrous benzene. The reaction mixture is stirred at room temperature for 3 days and at the end of this time the suspension is filtered off and discarded. The clear benzene filtrate containing the product is lyophilized to give a substantially quantitative yield of white crystals melting at 65–66° C. The crystalline product is free from bromide ions and infra-red analysis and hydrolysis confirmed the identity of the product as tri-n-octyl-n-propylammonium aluminohydride.

Example 2.—Preparation of dimethyl-distearyl-ammonium aluminohydride

To a stirred solution of 4 parts by weight of lithium aluminum hydride in 80 parts by weight of anhydrous benzene, is added a solution of 17.6 parts by weight of dimethyl-distearylammonium chloride in 1040 parts by weight of anhydrous benzene. The reaction mixture is stirred 5 days at 62–64° C. under nitrogen. At the end of this time the solution gives a negative halogen test. The reaction mixture is cooled to room temperature and filtered under a nitrogen atmosphere. The clear benzene filtrate containing the product is freeze-dried to give a substantially quantitative yield of a white fluffy crystalline solid. The white crystalline product is substantially free from chloride ion contamination. Elemental and infra-red analysis establishes the identity of the product as di-methyldistearylammonium aluminohydride.

Example 3.—Preparation of tetra-n-decylammonium aluminohydride

Adopting the procedures described in detail in Examples 1 and 2, tetra-n-decylammonium aluminohydride is prepared using lithium aluminum hydride and tetra-n-decylammonium chloride as reactants. Infra-red absorption and elemental analysis confirmed the structure of the product.

Example 4.—Preparation of tetra-n-dodecylammonium aluminohydride

Adopting the procedures described in detail in Examples 1 and 2, tetra-n-dodecylammonium aluminohydride is prepared using lithium aluminum hydride and tetra-n- dodecylammonium bromide as reactants. Infra-red absorption and elemental analysis confirmed the structure of the product.

Example 5.—Preparation of tetra-n-pentadecylammonium aluminohydride

Adopting the procedures described in detail in Examples 1 and 2, tetra-n-pentadecylammonium aluminohydride is prepared using lithum aluminum hydride and tetra-n-pentadecylammonium bromide as reactants. Infrared absorption and elemental analysis confirmed the structure of the product.

Example 6.—Preparation of tetra-n-octylammonium aluminohydride

Adopting the procedures described in detail in Examples 1 and 2, tetra-n-octylammonium aluminohydride is prepared using potassium aluminum hydride and tetra-n-octylammonium bromide as reactants. Infra-red absorption and elemental analysis confirmed the structure of the product.

Example 7.—Preparation of tetra-n-undecylammonium aluminohydride

Adopting the procedures described in detail in Examples 1 and 2, tetra-n-undecylammonium aluminohydride is prepared using sodium aluminum hydride and tetra-n-undecyl bromide as reactants. Infra-red absorption and elemental analysis confirmed the structure of the product.

Example 8.—Preparation of tetramethylammonium aluminohydride (A) Preparation of tetramethylammonium thiophenoxide intermediate.—To a stirred solution of 4.6 parts by weight of tetramethylammonium hydroxide in 40 parts by weight water, under a nitrogen atmosphere is added 5.5 parts by weight of thiophenol until dissolution is complete. A small quantity of diphenylsulfide by-product precipitates out during the mixing of the reagents and it is filtered off. The water is stripped off under vacuum at 45° C. and the tetramethylammonium thiophenoxide is dried at 70° C. under vacuum for 24 hours. At the end of this time an off white solid product in substantially quantitative yield is obtained. The infra-red spectrum showed no —SH or —OH absorption. Elemental analysis further corroborated the identity of the intermediate to be the desired thiophenoxide.

(B) Preparation of the product.—To a stirred suspension of 9.0 parts by weight of tetramethylammonium thiophenoxide product in 110 parts by weight of anhydrous tetrahydrofuran (covered by a nitrogen atmosphere) is added 2.2 parts by weight of lithium aluminum hydride in 200 parts by weight of anhydrous tetrahydrofuran. The reaction mixture is stirred under the nitrogen atmosphere for 2 days and the insoluble white precipitate fitered off. The precipitate is washed thoroughly with anhydrous tetrahydrofuran and is dried under vacuum at room temperature overnight. A yield of approximately 90% of theory is obtained. Infra-red absorption, elemental analysis and hydrolysis studies confirm the preparation of the desired tetramethylammonium aluminohydride.

Example 9.—Preparation of tetra-n-propylammonium aluminohydride (A) Preparation of tetra-n-propylammonium thiophenoxide intermediate.—To a stirred solution of 9.3 parts by weight of tetrapropylammonium hydroxide in 90 parts by weight of water, under a nitrogen atmosphere, is added 5.5 parts by weight of thiophenol until dissolution is complete. A small quantity of precipitate which forms is filtered off. The water is stripped off at 50° C. under strong vacuum and the tetra-n-propylammonium thiophenoxide dried at 65° C. under vacuum for 24 hours. At the end of the drying time an off colored solid substance is obtained in substantially quantitative yield. Analysis of the intermediate product shows a negative —SH or —OH absorption, and elemental analysis confirmed the identity of the product to be the tetra-n-propylammonium thiophenoxide.

(B) Preparation of the product.—To a stirred suspension of 14.8 parts by weight of tetra-n-propylammonium thiophenoxide in 100 parts by weight of anhydrous tetrahydrofuran, is added 2.2 parts by weight of lithium aluminum hydride in 200 parts by weight of tetrahydrofuran. During the stirring and additions the reaction mixture is kept under a nitrogen atmosphere. The reaction mixture is stirred under nitrogen for 3 days and the insoluble product filtered off. The precipitate is washed thoroughly with anhydrous tetrahydrofuran and is dried under vacuum at room temperature overnight, a yield of approximately 87% of theory is obtained. Infra-red, elemental analysis and hydrolysis studies confirm that the product is tetra-n-propylammonium aluminohydride.

Example 10.—Preparation of dimethyl-dihexylammonium aluminohydride (A) Preparation of diemthyl-dihexyl ammonium thiophenoxide intermediate.—To a stirred solution of 6.9 parts by weight of dimethyl-dihexylammonium hydroxide in 40 parts by weight water, kept under a nitrogen atmosphere, is added 3.3 parts by weight of thiophenol until dissolution is complete. The solution is clarified by filtration and the water stripped off under 50° C. under vacuum. The intermediate product is dried at 60° C. under vacuum for 24 hours. At the end of this time the off-colored intermediate is obtained in substantially quantitative yield. Infra-red analysis indicates that no —SH or —OH groups are present and elemental analysis confirmed that the composition is the desired dimethyl-dihexylammonium thiophenoxide.

(B) Preparation of the product.—To a stirred suspension of 9.7 parts by weight of dimethyl-dihexylammonium phenoxide dissolved in 100 parts by weight of anhydrous tetrahydrofuran is added 2.0 parts by weight of lithium aluminum hydride in 150 parts by weight of anhydrous tetrahydrofuran. The reaction mixture is kept under a nitrogen atmosphere during the stirring and additions. After 2 days of stirring the precipitated product is filtered off and washed throughly with anhydrous tetrahydrofuran. The washed product is dried under vacuum at room temperature over night and weighed yielding approximately 90% yield of product is obtained. Infra-red, elemental analysis and hydrolysis studies confirm the product to be dimethyl-dihexylammonium aluminohydride.

Example 11.—Preparation of tetraethylammonium aluminohydride (A) Preparation of tetraethylammonium thiophenoxide intermediate.—Using the procedure described in Example 8 (A) tetraethylammonium thiophenoxide is prepared by reacting equi-molar quantities of tetraethylammonium hydroxide and thiophenol in an aqueous solution and under a nitrogen atmosphere. A near quantitative yield of intermediate is obtained. Infra-red absorption and elemental analysis of the intermediate corroborated its identity.

(B) Preparation of product.—Following the procedure of Example 8 (B) tetraethylammonium aluminohydride is prepared by reacting 2.8 parts by weight of lithium aluminum hydride with 12 parts by weight of tetraethylammonium thiophenoxide in the presence of 300 parts by weight of anhydrous tetrahydrofuran. The products' identity is established by infra-red, elemental analysis and hydrolysis studies.

Example 12.—Preparation of tetra-n-butylammonium aluminohydride (A) Preparation of tetra-n-butylammonium thiophenoxide intermediate.—Using the procedure described in Example 8 (A) tetra-n-butylammonium thiophenoxide is prepared by reacting equi-molar quantities of tetra-n- butylammonium hydroxide and thiophenol in an aqueous solution and under a nitrogen atmosphere. A near quantitative yield of intermediate is obtained. Infra-red absorption and elemental analysis of the intermediate corroborated its identity.

(B) Preparation of product.—Following the procedure of Example 8 (B) tetra-n-butylammonium aluminohydride is prepared by reacting 2.8 parts by weight of lithium aluminum hydride with 12 parts by weight of tetraethylammonium thiophenoxide in the presence of 300 parts by weight of anhydrous tetrahydrofuran. The products' identity is established by infra-red, elemental analysis and hydrolysis studies.

Example 13.—Preparation of tetra-n-pentylammonium aluminohydride (A) Preparation of tetra-n-pentylammonium thiophenoxide intermediate.—Using the procedure described in Example 8 (A) tetra-n-pentylammonium thiophenoxide is prepared by reacting equimolar quantities of tetra-n-pentylammonium hydroxide and thiophenol in an aqueous solution and under a nitrogen atmosphere. A near quantitative yield of intermediate is obtained. Infra-red absorption and elemental analysis of the intermediate corroborated its identity.

(B) Preparation of the product.—Following the procedure of Example 8 (B) tetra-n-pentylammonium aluminohydride is prepared by reacting 2.5 parts by weight of lithium aluminum hydride with 21 parts by weight of tetra-n-pentylammonium thiophenoxide in the presence of 300 parts by weight of anhydrous tetrahydrofuran. The products' identity is established by infra-red elemental analysis and hydrolysis studies.

Example 14.—Preparation of dimethyl-diethyl-ammonium aluminohydride (A) Preparation of dimethyl-diethylammonium thiophenoxide intermediate.—Using the procedure described in Example 8 (A) dimethyl-diethylammonium thiophenoxide is prepared by reacting equimolar quantities of dimethyl-diethylammonium hydroxide and thiophenol in an aqueous solution and under a nitrogen atmosphere. A near quantitative yield of intermediate is obtained. Infra-red absorption and elemental analysis of the intermediate corroborated its identity.

(B) Preparation of product.—Following the procedure of Example 8 (B) dimethyl-diethylammonium aluminohydride is prepared by reacting 2.5 parts by weight of lithium aluminum hydride with 13 parts by weight of dimethyl-diethylammonium thiophenoxide in the presence of 300 parts by weight of anhydrous tetrahydrofuran. The products' identity is established by infra-red, elemental analysis and hydrolysis studies.

It is to be understood that the foregoing examples are illustrative only and that various changes and modifications can be made in the ingredients, proportions and reaction conditions set forth without deviating from the concept of this invention as defined in the following claims.

I claim:
1. The process for preparing quaternary ammonium aluminohydrides comprising contacting an alkali metal aluminum hydride with a quaternary ammonium thioaryloxide of the formula:

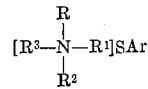

wherein R, $R^1$, $R^2$ and $R^3$ are alkyl radicals and Ar is selected from the group consisting of aryl and substituted aryl radicals.

2. The process of claim 1 wherein the alkali metal aluminum hydride is lithium aluminum hydride.

3. The process of claim 1 wherein the alkali metal aluminum hydride is sodium aluminum hydride.

4. The process of claim 1 wherein the alkali metal aluminum hydride is potassium aluminum hydride.

5. The process of claim 1 wherein the quaternary ammonium thioaryloxide is a thiophenoxide and the alkali metal aluminum hydride is lithium aluminum hydride.

6. The process of claim 1 wherein the quaternary ammonium aluminohydride is tetramethylammonium aluminohydride.

7. The process of claim 1 wherein the quaternary ammonium aluminohydride is tetraethylammonium aluminohydride.

8. The process of claim 1 wherein the quaternary ammonium aluminohydride is tetra-n-propylammonium aluminohydride.

9. The process of claim 1 wherein the quaternary ammonium aluminohydride is tetra-n-butylammonium aluminohydride.

10. The process of claim 1 wherein the total number of carbon atoms in the groups R, $R^1$, $R^2$ and $R^3$ is less than 16.

11. The process of claim 1 wherein R, $R^1$, $R^2$, and $R^3$ each is an alkyl group of 1 to 6 carbon atoms.

12. The process of claim 1 wherein Ar is a phenyl group.

13. The process of claim 1 wherein R, $R^1$, $R^2$ and $R^3$ each is an alkyl of 1 to 6 carbon atoms, the total number of carbon atoms of said R, $R^1$, $R^2$ and $R^3$ is less than 16, and Ar is a phenyl group.

References Cited

UNITED STATES PATENTS 3,072,698   1/1963   Hinckley _____ 260—448

OTHER REFERENCES

Lange's Handbook of Chemistry, sixth edition, 1946, TP151 H 25.

TOBIAS E. LEVOW, *Primary Examiner.*

U.S. Cl. X.R.

252—188